(12) United States Patent
Chen et al.

(10) Patent No.: US 11,538,251 B2
(45) Date of Patent: Dec. 27, 2022

(54) VEHICLE CONTROL AND 3D ENVIRONMENT EXPERIENCE WITH OR WITHOUT VISUALIZATION BASED ON 3D AUDIO/VISUAL SENSORS

(71) Applicant: RAYZ TECHNOLOGIES CO. LTD., Beijing (CN)

(72) Inventors: Ruxin Chen, Beijing (CN); Detao Du, Beijing (CN)

(73) Assignee: RAYZ TECHNOLOGIES CO. LTD., Beijing (CN)

( * ) Notice: Subject to any disclaimer, the term of this patent is extended or adjusted under 35 U.S.C. 154(b) by 246 days.

(21) Appl. No.: 16/923,208

(22) Filed: Jul. 8, 2020

(65) Prior Publication Data
US 2021/0012117 A1  Jan. 14, 2021

(30) Foreign Application Priority Data
Jul. 8, 2019 (CN) .......................... 201910610646.4

(51) Int. Cl.
*G06T 17/00* (2006.01)
*G06V 20/56* (2022.01)

(52) U.S. Cl.
CPC .............. *G06V 20/56* (2022.01); *G06T 17/00* (2013.01)

(58) Field of Classification Search
None
See application file for complete search history.

(56) References Cited

U.S. PATENT DOCUMENTS

| 10,063,988 | B2 | 8/2018 | Muench et al. |
| 10,207,718 | B2 | 2/2019 | Liu |
| 10,552,691 | B2 | 2/2020 | Li et al. |
| 2017/0240185 | A1 | 8/2017 | Li |
| 2019/0200091 | A1 | 6/2019 | Ramalingam et al. |

(Continued)

FOREIGN PATENT DOCUMENTS

| CN | 105654753 A | 6/2016 |
| CN | 107097793 A | 8/2017 |

(Continued)

OTHER PUBLICATIONS

China National Intellectual Property Administration, First Office Action for App No. 201910610646.4, dated May 7, 2020, 9 pages.

*Primary Examiner* — Idowu O Osifade
(74) *Attorney, Agent, or Firm* — Loeb & Loeb LLP

(57) ABSTRACT

Provided is a method for controlling a vehicle, including: receiving a plurality of visual sensor signals containing three-dimensional visual information outside and inside the vehicle; receiving a plurality of audio sensor signals containing three-dimensional audio information outside and inside the mobile vehicle; determining three-dimensional spatial positions of at least two objects and object cognitive information of the at least two objects according to at least a portion of the plurality of visual sensor signals and at least a portion of the plurality of audio sensor signals, wherein the at least two objects include at least one object outside the vehicle and at least one object inside the vehicle; obtaining a circumstance information of the vehicle according to the object cognitive information; and determining operation instructions for the vehicle according to the circumstance information.

20 Claims, 3 Drawing Sheets

(56) References Cited

U.S. PATENT DOCUMENTS

| | | | |
|---|---|---|---|
| 2020/0109954 A1* | 4/2020 | Li ........................ | G05D 1/0278 |
| 2020/0226355 A1* | 7/2020 | el Kaliouby ............ | G16H 20/40 |
| 2021/0397859 A1* | 12/2021 | Arora ........................ | G06T 7/74 |
| 2022/0126864 A1* | 4/2022 | Moustafa .............. | B60W 50/16 |
| 2022/0126878 A1* | 4/2022 | Moustafa .............. | B60W 50/14 |

FOREIGN PATENT DOCUMENTS

| | | |
|---|---|---|
| CN | 107415602 A | 12/2017 |
| CN | 107816976 A | 3/2018 |
| CN | 108058683 A | 5/2018 |
| CN | 109572701 A | 4/2019 |

* cited by examiner

VEHICLE CONTROL AND 3D ENVIRONMENT EXPERIENCE WITH OR WITHOUT VISUALIZATION BASED ON 3D AUDIO/VISUAL SENSORS

CROSS-REFERENCE TO RELATED APPLICATIONS

The present invention claims priority to Chinese application number 201910610646.4, filed on Jul. 8, 2019, whose disclosure is incorporated by reference in its entirety herein.

TECHNICAL FIELD

The present invention relates to vehicles and sensors, and more particularly, to methods and apparatuses for controlling vehicle, methods and apparatuses for providing 3D environment experience/content with or without visualization in vehicle, and sensor systems for vehicle.

The term "vehicle" is used in this document to describe transportation device including but not limited to vehicle, trailer, wagon, motorcycle, bicycle, ship, airplane, and spacecraft. The inside of a vehicle with an open space, such as a motorcycle, means a predetermined space within the range of 5 meters or less of the vehicle which contains objects that the vehicle carries with. A sensor being inside a vehicle means the sensor is facing toward the vehicle instead of facing away from the vehicle. A gesture of an object is obvious for a robot, for other object could just means the presentation of the object.

BACKGROUND

In recent years, with the development of sensor hardware such as Light Detection and Ranging (LiDAR) and artificial intelligence image recognition software, vehicle automatic driving technology has gradually entered the practical stage. However, the current automatic driving software and hardware solutions can only control the vehicle to maneuver by identifying the spatial location of objects such as obstacles, vehicles, pedestrians, animals, etc., and lack the overall understanding of the environment inside and outside the vehicle, thus it is impossible to achieve vehicle control that fully adapts to the environment.

In addition, although extensive 3D environment experience/content with or without visualization technologies such as virtual reality, augmented reality and mixed reality have been used in home entertainment, gaming, map navigation, marketing display, education and training, etc., no extensive solution has been proposed to provide 3D environment experience with or without visualization in vehicles (especially autonomous vehicles).

SUMMARY

Therefore, in order to solve the above problems, the present invention provides a vehicle, a control method and an apparatus that can adapt to the environment, and a vehicle, a control method and an apparatus that can provide 3D environment experience with or without visualization. In addition, the present invention also provides a sensor system for the above vehicle.

According to an aspect of an embodiment of the present invention, a method for controlling a vehicle is provided, comprising: receiving a plurality of visual sensor signals containing three-dimensional visual information outside and inside the vehicle; receiving a plurality of audio sensor signals containing three-dimensional audio information outside and inside the vehicle; determining three-dimensional spatial positions of at least two objects and object cognitive information of the at least two objects according to at least a portion of the plurality of visual sensor signals and at least a portion of the plurality of audio sensor signals, wherein the at least two objects include at least one object outside the vehicle and at least one object inside the vehicle; obtaining a circumstance information of the vehicle according to the object cognitive information; and determining an operation instruction for the vehicle according to the circumstance information.

According to an embodiment of the present invention, the determining the three-dimensional spatial positions of at least two objects includes: determining a correspondence between three-dimensional visual information sources and three-dimensional audio information sources in three-dimensional space based on at least a portion of the plurality of visual sensor signals and at least a portion of the plurality of audio sensor signals; and determining the three-dimensional space positions of the at least two objects according to the correspondence, wherein each of the at least two objects corresponds to a pair of three-dimensional visual information source and three-dimensional audio information source in the same three-dimensional space position.

According to an embodiment of the present invention, the at least two objects include a person and/or an object, and the object cognitive information includes at least one of a gesture, a posture, an action, an expression, a gaze, a voice, a position of the person, and/or a gesture, a posture, an action, a sound, a position of the object.

According to an embodiment of the present invention, at least one of the object cognitive information and the circumstance information is calculated based on deep learning, and the object cognitive information includes hidden layer information in a deep network.

According to an embodiment of the present invention, a first deep network is used to calculate the object cognitive information of the object outside the vehicle, a second deep network is used to calculate the object cognitive information of the object inside the vehicle, and a third deep network containing an embedded layer is used to calculate the circumstance information.

According to an embodiment of the present invention, the method further includes pre-storing a circumstance information mapping table containing a mapping relationship between circumstance information and operation instruction, wherein the determining the operation instruction for the vehicle includes selecting an operation instruction from the circumstance information mapping table according to the circumstance information.

According to an embodiment of the present invention, the circumstance information includes a combination of an external circumstance information and an internal circumstance information of the vehicle.

According to an embodiment of the present invention, the plurality of visual sensor signals includes at least one set of external visual sensor signals and at least one set of internal visual sensor signals, and each set of visual sensor signals includes a three-dimensional ranging signal and/or a two-dimensional image signal.

According to an embodiment of the present invention, the plurality of visual sensor signals includes at least one set of external visual sensor signals and at least two sets of internal visual sensor signals.

According to an embodiment of the present invention, at least one set of visual sensor signals includes a three-dimensional ranging signal and a two-dimensional image signal.

According to an embodiment of the present invention, the plurality of audio sensor signals include at least one set of external audio sensor signals and at least one set of internal audio sensor signals, and each set of audio sensor signals includes at least two microphone signals.

According to another aspect of an embodiment of the present invention, an apparatus for controlling a vehicle is provided, comprising: a processor; and a memory configured to store computer program instructions thereon which, when executed by the processor cause the apparatus to perform the above method.

According to another aspect of an embodiment of the present invention, a vehicle comprising the above apparatus is provided.

According to another aspect of an embodiment of the present invention, a method for providing 3D environment experience with or without visualization in a vehicle comprises: receiving a plurality of visual sensor signals containing three-dimensional visual information outside and inside the vehicle; receiving a plurality of audio sensor signals containing three-dimensional audio information outside and inside the vehicle; determining three-dimensional space positions of at least two objects and calculate object cognitive information of the at least two objects based on at least a portion of the plurality of visual sensor signals and at least a portion of the plurality of audio sensor signals, wherein the at least two objects include at least one object outside the vehicle and at least one object inside the vehicle; and producing and processing 3D environment content with or without visualization according to the object cognitive information.

According to an embodiment of the present invention, the determining the three-dimensional spatial positions of at least two objects includes: determining a correspondence between three-dimensional visual information sources and three-dimensional audio information source in three-dimensional space based on at least a portion of the plurality of visual sensor signals and at least a portion of the plurality of audio sensor signals; and determining the three-dimensional space positions of the at least two objects according to the correspondence, wherein each of the at least two objects corresponds to a pair of three-dimensional visual information source and three-dimensional audio information source in the same three-dimensional space position.

According to an embodiment of the present invention, the at least two objects include a person and/or an object, and the object cognitive information includes at least one of a gesture, a posture, an action, an expression, a gaze, a voice, a position of the person, and/or at least one of a gesture, a posture, an action, a sound, a position of the object.

According to an embodiment of the present invention, the object cognitive information is calculated based on deep learning.

According to an embodiment of the present invention, a first deep network is used to calculate the object cognitive information of the object outside the vehicle, and a second deep network is used to calculate the object cognitive information of the object inside the vehicle.

According to an embodiment of the present invention, the plurality of visual sensor signals includes at least one set of external visual sensor signals and at least one set of internal visual sensor signals, and each set of visual sensor signals includes a three-dimensional ranging signal and/or a two-dimensional image signal.

According to an embodiment of the present invention, the plurality of visual sensor signals includes at least one set of external visual sensor signals and at least two sets of internal visual sensor signals.

According to an embodiment of the present invention, at least one set of visual sensor signals includes a three-dimensional ranging signal and a two-dimensional image signal.

According to an embodiment of the present invention, the plurality of audio sensor signals include at least one set of external audio sensor signals and at least one set of internal audio sensor signals, and each set of audio sensor signals includes at least two microphone signals.

According to an embodiment of the present invention, the 3D environment content with or without visualization includes virtual reality content, augmented reality content, and/or mixed reality content, and the object cognitive information includes an interactive instruction between a user and a virtual object, a real object, and/or a mixed object.

According to an embodiment of the present invention, the 3D environment content with or without visualization includes a seamless fusion of the environment outside and inside the vehicle.

According to an embodiment of the present invention, the method further includes: sending the object cognitive information to at least one vehicle; receiving object cognitive information from the at least one vehicle; and producing and processing 3D environment content with or without visualization shared among a plurality of vehicles according to the object cognitive information and the received object cognitive information.

According to another aspect of an embodiment of the present invention, there is provided an apparatus for providing 3D environment experience with or without visualization in a vehicle, including: a processor; and a memory configured to store computer program instructions thereon which, when executed by the processor, cause the apparatus to execute the above method.

According to another aspect of an embodiment of the present invention, a vehicle including the apparatus is provided.

According to another aspect of an embodiment of the present invention, a sensor system for vehicle is provided, comprising: a plurality of visual sensors for sensing three-dimensional visual information outside and inside the vehicle; and a plurality of audio sensors for sensing three-dimensional audio information outside and inside the vehicle.

According to an embodiment of the present invention, the plurality of visual sensors includes at least one set of external visual sensors and at least one set of internal visual sensors, and each set of visual sensors includes a three-dimensional ranging sensor and/or a two-dimensional image sensor.

According to an embodiment of the present invention, the plurality of visual sensors includes at least one set of external visual sensors and at least two sets of internal visual sensors.

According to an embodiment of the present invention, at least one set of visual sensors includes a three-dimensional ranging sensor and a two-dimensional image sensor.

According to an embodiment of the present invention, the plurality of audio sensors include at least one set of external audio sensors and at least one set of internal audio sensors, and each set of audio sensors includes at least two microphones.

By using the sensor system, vehicle, control method and apparatus according to the present invention, the operation of the vehicle can be adaptively controlled according to the environment inside and outside the vehicle.

By using the sensor system, vehicle, control method and apparatus according to the present invention, 3D environment experiences with or without visualization such as virtual reality, augmented reality and mixed reality can be provided in the vehicle.

DETAILED DESCRIPTION

Figure 1:
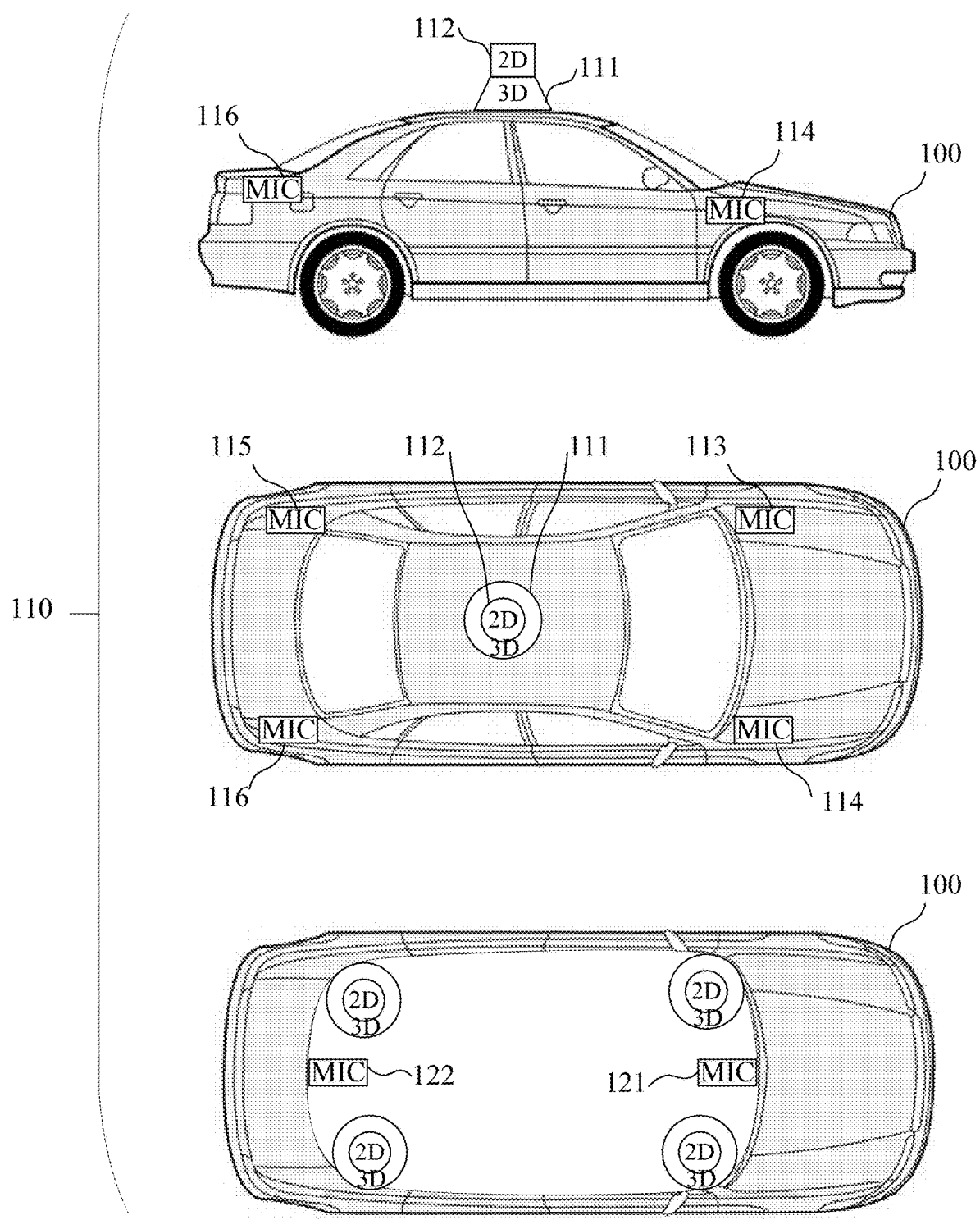
FIG. 1 shows a view of a vehicle 100 including a sensor system 110 for vehicle according to an embodiment.

Hereinafter, exemplary embodiments according to the present invention will be described in detail with reference to the accompanying drawings. In the drawings, the same or similar reference numerals are given to components having substantially the same structure and function, and in order to make the description more concise, redundant descriptions about the substantially same components are omitted.

The invention provides a vehicle, a control method and an apparatus thereof, and a sensor system for the vehicle. The above-mentioned vehicle may include ground vehicles, vessels and aircrafts. For the ease of description, the following embodiments use ground vehicle as an examples of vehicle, but the scope of the present invention is not limited thereto.

FIG. 1 shows a view of a vehicle 100 including a sensor system 110 for vehicle according to an embodiment.

Referring to FIG. 1, the sensor system 110 includes a plurality of visual sensors and a plurality of audio sensors installed outside and inside the vehicle 100, and these sensors are used to sense three-dimensional visual information and three-dimensional audio information outside and inside the vehicle.

Shown in the top and the middle of FIG. 1 are an external side view and an external top view of the vehicle 100, respectively. As can be seen from the figure, a set of visual sensors is installed on the top of the vehicle 100, which may include a three-dimensional ranging sensor 111 and a two-dimensional image sensor 112. Two sets of hearing sensors are also installed outside the vehicle 100. The first set of audio sensors may include microphones 113, 114 installed on both sides of the front of the vehicle 100. The second set of hearing sensors may include microphones 115, 116 mounted on both sides of the rear of the vehicle 100.

The lower portion of FIG. 1 is a top view of the interior of the vehicle 100. Installed inside the vehicle 100 are four sets of visual sensors including a three-dimensional distance sensor and a two-dimensional image sensor, and a set of hearing sensors including microphones 121 and 122.

By installing multiple sets of visual sensors and audio sensors outside and inside the vehicle 100, the sensor system 110 can provide three-dimensional visual information and three-dimensional audio information outside and inside the vehicle 100 for determining three-dimensional spatial positions of the external objects and internal objects of the vehicle 100 and information about the circumstance of the vehicle 100. Specifically, a correspondence the three-dimensional visual information sources and three-dimensional audio information sources in the three-dimensional space is determined according to the visual sensor signals and the audio sensor signals, and a pair of three-dimensional visual information source and three-dimensional audio information source is determined to be the same object according to the correspondence relationship, so that the circumstance information can be determined by comprehensively considering the three-dimensional visual information and the three-dimensional audio information of the object.

The three-dimensional ranging sensor in the sensor system 110 may be a three-dimensional point cloud sensor for generating a three-dimensional ranging signal. The two-dimensional image sensor may be a camera for generating a two-dimensional image signal. The three-dimensional ranging signal and the two-dimensional image signal may contain three-dimensional visual information. Each set of microphones in the sensor system 110 can collectively generate a three-dimensional sound signal containing three-dimensional audio information.

The sensor system 110 includes a set of external visual sensors and four sets of internal visual sensors, but this is merely an example. According to the present invention, the sensor system 110 may include at least one set of external visual sensors and at least two sets of internal visual sensors. By installing more than one set (for example, two sets or four sets) of internal visual sensors, three-dimensional visual information can be collected from multiple angles, thereby realizing an all-round sensing of internal objects without blind angle and helping to determine information on the vehicle's internal circumstance.

The sensor system 110 includes two sets of external audio sensors and a set of internal audio sensors, but this is merely an example. According to the present invention, the sensor system 110 may include at least one set of external audio sensors and at least one set of internal audio sensors.

In the sensor system 110, each set of visual sensors includes both a three-dimensional ranging sensor and a two-dimensional image sensor, which makes it possible to combine both the three-dimensional ranging signal and the two-dimensional image signal to more accurately determine the spatial position of the object, but this is merely an example. According to the present invention, each set of visual sensors may include only one of a three-dimensional ranging sensor and a two-dimensional image sensor. In order to improve the accuracy of determining the spatial position of the object, preferably, at least one set of visual sensors includes a three-dimensional ranging sensor and a two-dimensional image sensor.

In the sensor system 110, each set of audio sensors includes two microphones, but this is only an example. According to the invention, each set of audio sensors may also include more than two microphones.

Figure 2:
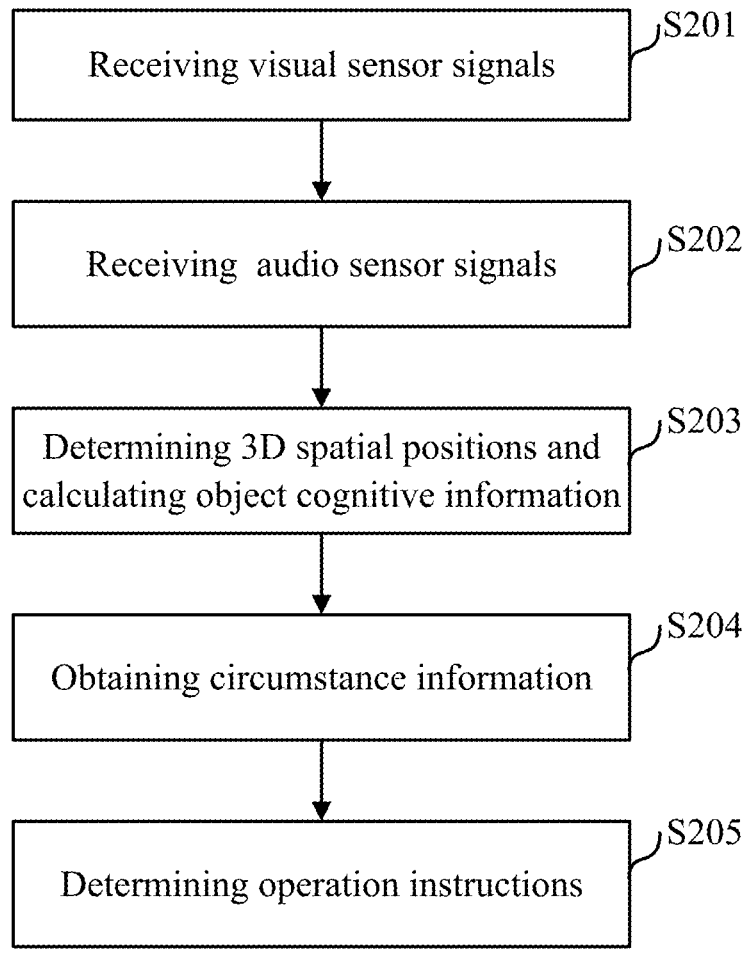
FIG. 2 shows a flowchart of a method for controlling the vehicle 100 according to an embodiment.

FIG. 2 shows a flowchart of a method for controlling the vehicle 100 according to an embodiment.

In steps S201 and S202, a plurality of visual sensor signals and a plurality of audio sensor signals are received.

These visual sensor signals and audio sensor signals may be generated by the sensor system 110 and contain three-dimensional visual information and three-dimensional audio information outside and inside the vehicle 100, respectively.

In an embodiment, the plurality of visual sensor signals may include at least one set of external visual sensor signals and at least one set of internal visual sensor signals, and each set of visual sensor signals may include a three-dimensional ranging signal and/or a two-dimensional image signal. Preferably, the plurality of visual sensor signals may include at least one set of external visual sensor signals and at least two sets of internal visual sensor signals. Preferably, at least one set of visual sensor signals may include a three-dimensional ranging signal and a two-dimensional image signal.

In an embodiment, the multiple audio sensor signals may include at least one set of external audio sensor signals and at least one set of internal audio sensor signals, and each set of audio sensor signals may include at least two microphone signals.

In step S203, based on at least a portion of the plurality of visual sensor signals and at least a portion of the plurality of audio sensor signals, three-dimensional space positions of at least one object outside the vehicle 100 and at least one object inside are determined, and an object cognitive information for each object is calculated.

In an embodiment, a correspondence between three-dimensional visual information sources and three-dimensional audio information sources in the three-dimensional space may be determined according to at least a portion of the plurality of visual sensor signals and at least a portion of the plurality of audio sensor signals, and then a three-dimensional space position of each object is determined according to the correspondence, where each object corresponds to a pair of three-dimensional visual information source and three-dimensional audio information source in the same three-dimensional space position.

In an embodiment, the objects may include persons and/or objects, such as pedestrians, passengers, obstacles, vehicles, animals, objects in the vehicle, and the like. The object cognitive information may include at least one of a gesture, a posture, an action, an expression, a gaze, a voice, a position of a person, and/or at least one of a gesture, a posture, an action, a sound, a position of an object.

In an embodiment, object cognitive information may be calculated based on deep learning. That is, the visual sensor signal and the audio sensor signal (pre-processed if necessary) are used as the input of the deep network, and the object cognitive information is calculated through machine learning training. The object cognitive information may include both human-readable information and hidden layer information in the deep network.

In an embodiment, different networks can be trained for external and internal objects. Specifically, two deep networks may be used to calculate the object cognitive information of external objects and internal objects of the vehicle 100, respectively.

In step S204, a circumstance information of the vehicle 100 is obtained based on the object cognitive information.

Figure 3:
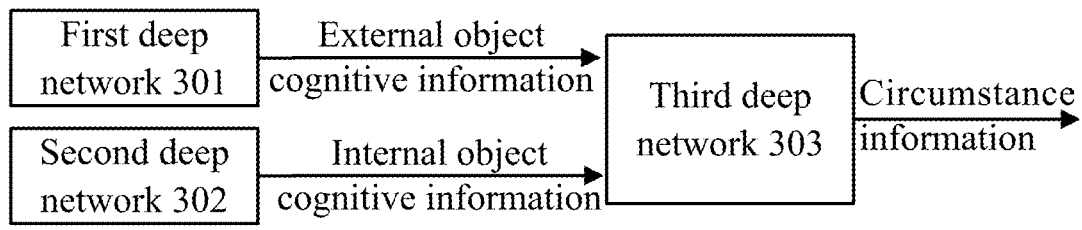
FIG. 3 shows a schematic diagram of calculating object cognitive information and circumstance information based on deep learning according to an embodiment.

In an embodiment, the circumstance information may be calculated based on deep learning. For example, the object cognitive information output from the first deep network 301 and the second deep network 302 may be used as the input of the third deep network 303, as shown in FIG. 3. Specifically, a third deep network containing an embedded layer may be used to calculate the circumstance information.

In step S205, an operation instruction of the vehicle 100 is determined according to the circumstance information.

In an embodiment, a circumstance information mapping table containing a mapping relationship between circumstance information and operation instructions may be pre-stored, so that an operation instruction may be selected from the circumstance information mapping table according to the circumstance information.

In an embodiment, the circumstance information may include a combination of external circumstance information and internal circumstance information of the vehicle 100. That is, separate circumstance information is generated for external circumstances and internal circumstances, respectively.

Table 1 shows a circumstance information mapping table according to an embodiment. The circumstance and the operation instructions shown in this table are only examples, and the present invention is not limited thereto.

TABLE 1

| External circumstance | Internal circumstance | Operation instruction |
|---|---|---|
| About to collide | Passengers in activity | Emergency brake |
| About to collide | Passengers resting | Start special protection system, emergency brake |
| Pedestrian about to cross the road | N/A | Slow down, stop and wait |
| Severe congestion ahead | N/A | Re-plan route, activate turn signal and change lane, prepare to leave current road |
| N/A | Passengers ready to rest | Turn off A/V system, close windows, reduce wind speed of air conditioner |
| Suspected gunshots, screams, pedestrians running around | Passengers screaming and looking terrified | Accelerate to leave the place, notify emergency contacts, call police |
| Suspected gunshots, cheers, pedestrians standing calmly | Passengers smiling and looking relaxed | Continue to drive normally |
| Suspected siren, vehicle trailing and approaching | Passengers cursing and looking depressed | Slow down and prepare to pull over |
| Suspected siren, vehicle trailing and approaching | Passengers unconcerned and looking relaxed | Continue to drive normally |

TABLE 1-continued

| External circumstance | Internal circumstance | Operation instruction |
|---|---|---|
| Suspected siren, vehicle trailing and approaching | Passengers calling for help and looking terrified | Accelerate to leave the place |

As shown in Table 1, when it is determined that the external circumstance is "About to collide", if the internal circumstance is "Passengers in activity", an operation instruction may be generated to cause the vehicle 100 to brake urgently. If the internal circumstance is "Passengers resting", in order to prevent passengers from being injured, an operation instruction to activate a special protection system is issued before emergency braking.

When it is determined that the external circumstance is "Pedestrian about to cross the road", regardless of the internal scene, the vehicle 100 may be decelerated first, and then stopped, waiting for the pedestrian to pass.

When it is determined that the external circumstance is "Severe congestion ahead", the vehicle 100 may be allowed to re-plan the route and change lanes to prepare for the new route.

When it is determined that the internal circumstance is "Passengers ready to rest", the vehicle 100 may be allowed to close the A/V system, close the windows, and reduce the air-conditioning wind speed, so as not to disturb the resting passengers.

When it is determined that the external circumstance is "Suspected gunshots, screams, pedestrians running around", and the internal circumstance is "Passengers screaming and looking terrified", an operation instruction may be generated to accelerate the vehicle 100 to escape from the place, send a message to the emergency contact, and call the police. If it is determined that the external circumstance is "Suspected gunshots, cheers, pedestrians standing calmly", and the internal circumstance is "Passengers smiling and looking relaxed", it indicates that a dangerous circumstance is not encountered, and the vehicle 100 can continue to drive normally at this time.

When it is determined that the external circumstance is "Suspected siren, vehicle trailing and approaching", and if the internal circumstance is "Passengers cursing and looking depressed", an operation instruction may be generated to slow down the vehicle 100 and select an appropriate place to pull over. If the internal circumstance is "Passengers unconcerned and looking relaxed", it means that the siren has nothing to do with the car, and at this time, the vehicle 100 can continue to drive normally. If the internal circumstance is "Passengers calling for help and looking terrified", it indicates that the trailing vehicle is hostile and the passengers are in danger, and at this time, the vehicle 100 can be accelerated and driven away from the place.

According to the present invention, the vehicle 100 may include an apparatus for controlling a vehicle, the apparatus including: a processor; and a memory configured to store computer program instructions thereon, which when executed by the processor, cause the apparatus to execute the method described in the embodiment of FIG. 2.

Figure 4:
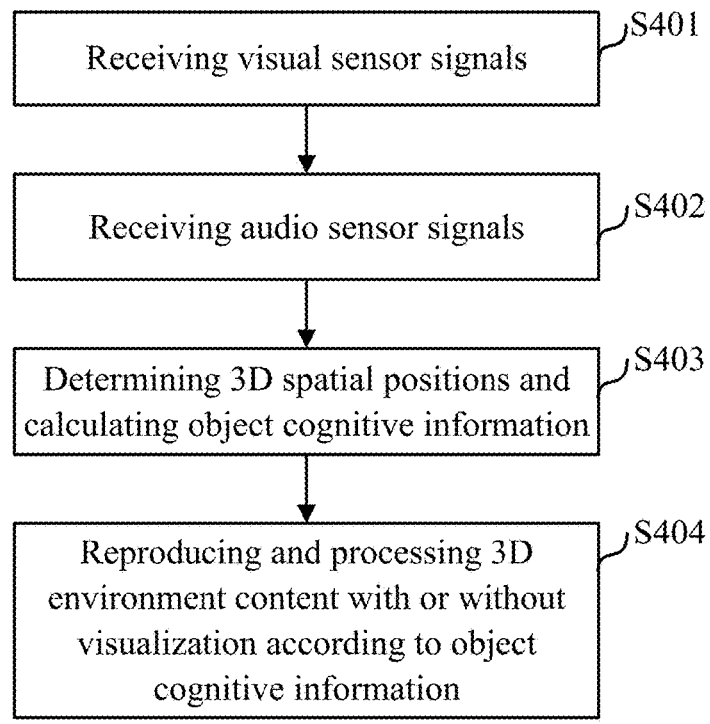
FIG. 4 shows a flowchart of a method for providing 3D environment experience with or without visualization in the vehicle 100 according to an embodiment.

FIG. 4 shows a flowchart of a method for providing 3D environment experience with or without visualization in the vehicle 100 according to an embodiment.

In steps S401 and S402, a plurality of visual sensor signals and a plurality of audio sensor signals are received. These visual sensor signals and audio sensor signals may be generated by the sensor system 110, and contain three-dimensional visual information and three-dimensional audio information outside and inside the vehicle 100, respectively . . . .

In an embodiment, the plurality of visual sensor signals may include at least one set of external visual sensor signals and at least one set of internal visual sensor signals, and each set of visual sensor signals may include a three-dimensional ranging signal and/or a two-dimensional image signal. Preferably, the plurality of visual sensor signals may include at least one set of external visual sensor signals and at least two sets of internal visual sensor signals. Preferably, at least one set of visual sensor signals may include a three-dimensional ranging signal and a two-dimensional image signal.

In step S403, based on at least a portion of the plurality of visual sensor signals and at least a portion of the plurality of audio sensor signals, the three-dimensional spatial positions of at least one object outside the vehicle 100 and at least one object inside are determined and an object cognitive information is calculated for each object.

In an embodiment, a correspondence between three-dimensional visual information sources and three-dimensional audio information sources in the three-dimensional space may be determined according to at least a portion of the plurality of visual sensor signals and at least a portion of the plurality of audio sensor signals, and then an three-dimensional space position of each object is determined according to the correspondence, where each object corresponds to a pair of three-dimensional visual information source and three-dimensional audio information source in the same three-dimensional space position.

In an embodiment, the objects may include persons and/or objects, such as pedestrians, passengers, trees, lawns, animals, objects in vehicles, and the like. The object cognitive information includes at least one of a gesture, a posture, an action, an expression, a gaze, a voice, a position of a person, and/or at least one of a gesture, a posture, an action, a sound, and a position of an object.

In an embodiment, the object cognitive information may be calculated based on deep learning. That is, the visual sensor signal and the audio sensor signal (pre-processed if necessary) are used as the input of the deep network, and the object cognitive information is calculated through machine learning training.

In an embodiment, different networks can be trained for external and internal objects. Specifically, the object cognitive information of the external object of the vehicle 100 may be calculated using the first deep network, and the object cognitive information of the internal object of the vehicle 100 may be calculated using the second deep network.

In step S404, the 3D environment content with or without visualization is reproduced and processed according to the object cognitive information.

In an embodiment, the 3D environment content with or without visualization may include virtual reality content, augmented reality content, and/or mixed reality content, and the object cognitive information may include interaction instructions between the user and the virtual object, real object, and/or mixed object. For example, by using the object cognitive information of objects inside and outside the vehicle, an 3D environment content with or without visualization that seamlessly merges the inside and the outside of the vehicle can be achieved, for example, extending the environment outside the vehicle (such as grasslands, forests, etc.) into the vehicle. In addition, by extracting the interaction instructions contained in the object cognitive information such as the passenger's gesture, posture, action, gaze, voice, etc., an interaction between the user and the virtual 3D environment content, augmented reality content, mixed reality content and other 3D environment content with or without visualization, and other 3D environment content with or without visualization can be realized.

Figure 5:
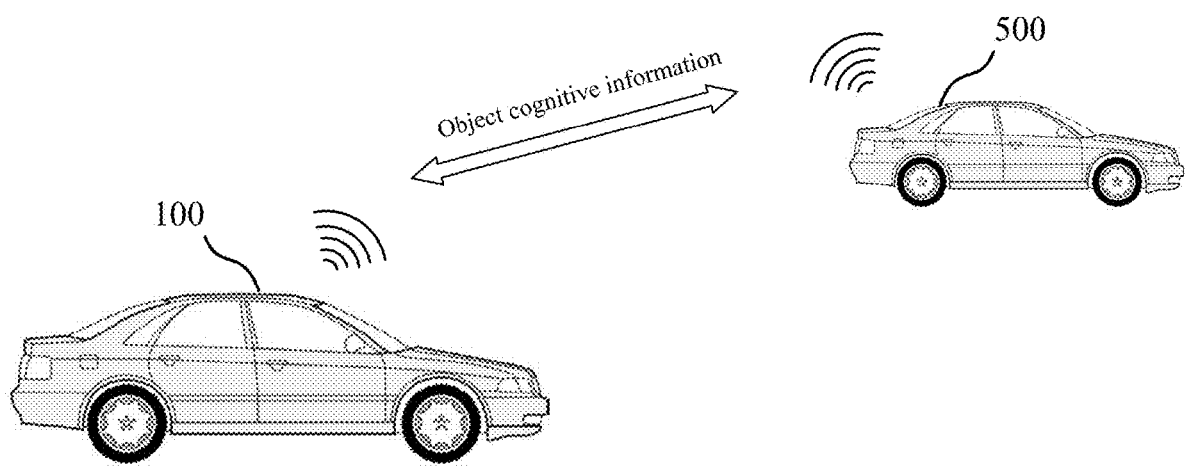
FIG. 5 shows a schematic diagram of exchanging object cognitive information between vehicles according to an embodiment.

In an embodiment, the object cognitive information may be sent and received between vehicles. For example, as shown in FIG. 5, the object cognitive information may be sent to one or more vehicle 500 and received from vehicle 500. Based on the object cognitive information of the vehicle 100 itself, and the object cognitive information received from the vehicle 500, the 3D environment content with or without visualization shared between the vehicle 100 and the vehicle 500 can be reproduced and processed. By sharing the 3D environment content with or without visualization among multiple vehicles, passengers of different vehicles can be placed in the same 3D environment content with or without visualization, thereby achieving remote interaction, for example, for applications such as virtual meetings, remote presentations, or virtual reality games.

According to the present invention, the vehicle 100 may include an apparatus for providing an 3D environment experience with or without in a vehicle, the device including: a processor; and a memory configured to store computer program instructions there on, which when executed by the processor, cause the apparatus to execute the method described in the embodiment of FIG. 4.

As described above, various embodiments of the present invention have been specifically described above, but the present invention is not limited thereto. Those skilled in the art should understand that various modifications, combinations, sub-combinations or substitutions can be made according to design requirements or other factors, and they are within the scope of the appended claims and their equivalents.

What is claimed is:

1. A method for controlling a vehicle, comprising:
   receiving a plurality of visual sensor signals containing three-dimensional visual information outside and inside the vehicle;
   receiving a plurality of audio sensor signals containing three-dimensional audio information outside and inside the vehicle;
   computing three-dimensional spatial positions of at least two objects and object cognitive information of the at least two objects according to at least a portion of the plurality of visual sensor signals and at least a portion of the plurality of audio sensor signals, wherein the at least two objects include at least one object outside the vehicle and at least one object inside the vehicle;
   obtaining a circumstance information of the vehicle according to the object cognitive information; and
   determining an operation instruction for the vehicle according to the circumstance information.

2. The method of claim 1, wherein the determining three-dimensional spatial positions of at least two objects comprises:
   determining a correspondence between three-dimensional visual information sources and three-dimensional audio information sources in three-dimensional space based on at least a portion of the plurality of visual sensor signals and at least a portion of the plurality of audio sensor signals; and
   determining the three-dimensional space positions of the at least two objects according to the correspondence, wherein each of the at least two objects corresponds to a pair of three-dimensional visual information source and three-dimensional audio information source in the same three-dimensional space position.

3. The method according to claim 1, wherein the at least two objects include a person and/or an object, and the object cognitive information includes at least one of a posture, a gesture, an action, an expression, a gaze, a voice, a position of the person, and/or at least one of a posture, a gesture, an action, a sound, and a position of the object.

4. The method of claim 1, wherein at least one of the object cognitive information and the circumstance information is calculated based on deep learning, the object cognitive information including hidden layer information in a deep network.

5. The method of claim 4, wherein a first deep network is used to calculate the object cognitive information of the object outside the vehicle, a second deep network is used to calculate the object cognitive information of the object inside the vehicle, and a third deep network containing an embedded layer is used to calculate the circumstance information.

6. The method of claim 1, further comprising pre-storing a circumstance information mapping table containing a mapping relationship between circumstance information and operation instruction,
   wherein determining the operation instruction for the vehicle includes selecting an operation instruction from the circumstance information mapping table according to the circumstance information.

7. The method of claim 6, wherein the circumstance information includes a combination of an external circumstance information and an internal circumstance information of the vehicle.

8. The method of claim 1, wherein the plurality of visual sensor signals include at least one set of external visual sensor signals and at least one set of internal visual sensor signals, and each set of visual sensor signals includes a three-dimensional ranging signal and/or a two-dimensional image signal.

9. The method of claim 8, wherein the plurality of visual sensor signals includes at least one set of external visual sensor signals and at least two sets of internal visual sensor signals.

10. The method of claim 8, wherein at least one set of visual sensor signals includes a three-dimensional ranging signal and a two-dimensional image signal.

11. The method of claim 1, wherein the plurality of audio sensor signals includes at least one set of external audio sensor signals and at least one set of internal audio sensor signals, and each set of audio sensor signals includes at least two microphone signals.

12. An apparatus for controlling a vehicle includes:
   a processor; and
   a memory configured to store computer program instructions thereon which, when executed by the processor, cause the apparatus to perform the method of claim 1.

13. A vehicle comprising the apparatus according to claim 12.

14. A method for providing 3D environment experience/content with or without visualization in a vehicle comprises:
receiving a plurality of visual sensor signals containing three-dimensional visual information outside and inside the vehicle;
receiving a plurality of audio sensor signals containing three-dimensional audio information outside and inside the vehicle;
computing three-dimensional spatial positions of at least two objects and object cognitive information of the at least two objects based on at least a portion of the plurality of visual sensor signals and at least a portion of the plurality of audio sensor signals, wherein the at least two objects include at least one object outside the vehicle and at least one object inside the vehicle; and
producing and processing 3D environment content with or without visualization according to the object cognitive information.

15. The method of claim 14, wherein the determining the three-dimensional spatial positions of at least two objects comprises:
determining a correspondence between three-dimensional visual information sources and three-dimensional audio information sources in three-dimensional space based on at least a portion of the plurality of visual sensor signals and at least a portion of the plurality of audio sensor signals; and
determining the three-dimensional space positions of the at least two objects according to the correspondence, wherein each of the at least two objects corresponds to a pair of three-dimensional visual information source and three-dimensional audio information source in the same three-dimensional space position.

16. The method according to claim 14, wherein the at least two objects include a person and/or an object, and the object cognitive information includes at least one of a posture, a gesture, an action, an expression, a gaze, a voice, a position of the person, and/or at least one of a posture, a gesture, an action, a sound, a position of the object.

17. The method of claim 14, wherein the plurality of visual sensor signals include at least one set of external visual sensor signals and at least one set of internal visual sensor signals, each set of visual sensor signals including a three-dimensional ranging signal and/or a two-dimensional image signal.

18. The method according to claim 14, wherein the 3D environment content with or without visualization includes virtual reality content, augmented reality content, and/or mixed reality content, and the object cognitive information includes an interactive instruction between a user and a virtual object, a real object, and/or a mixed object.

19. The method of claim 18, wherein the 3D environment content with or without visualization includes a seamless fusion of the environment outside and inside the vehicle.

20. The method of claim 18, further comprising:
sending the object cognitive information to at least one vehicle;
receiving object cognitive information from the at least one vehicle; and
producing and processing 3D environment content with or without visualization shared among a plurality of vehicles according to the object cognitive information and the received object cognitive information.

* * * * *